(12) United States Patent
Sinha et al.

(10) Patent No.: US 10,740,236 B2
(45) Date of Patent: Aug. 11, 2020

(54) NON-UNIFORM BUS (NUB) INTERCONNECT PROTOCOL FOR TILED LAST LEVEL CACHES

(71) Applicant: Samsung Electronics Co., Ltd., Gyeonggi-do (KR)

(72) Inventors: Vikas Sinha, Austin, TX (US); Eric C. Quinnell, Austin, TX (US); Jyotsna Kartha, Austin, TX (US)

(73) Assignee: Samsung Electronics Co., Ltd (KR)

( * ) Notice: Subject to any disclaimer, the term of this patent is extended or adjusted under 35 U.S.C. 154(b) by 354 days.

(21) Appl. No.: 15/677,739

(22) Filed: Aug. 15, 2017

(65) Prior Publication Data

US 2018/0329820 A1    Nov. 15, 2018

Related U.S. Application Data

(60) Provisional application No. 62/505,313, filed on May 12, 2017.

(51) Int. Cl.
| | |
|---|---|
| *G06F 15/17* | (2006.01) |
| *G06F 12/0831* | (2016.01) |
| *G06F 15/76* | (2006.01) |
| *G06F 3/06* | (2006.01) |

(52) U.S. Cl.
CPC .......... *G06F 12/0835* (2013.01); *G06F 15/17* (2013.01); *G06F 15/76* (2013.01); *G06F 3/06* (2013.01)

(58) Field of Classification Search
CPC ............................ G06F 12/0835; G06F 15/17
See application file for complete search history.

(56) References Cited

U.S. PATENT DOCUMENTS

| | | | |
|---|---|---|---|
| 4,885,578 A | 12/1989 | Perry et al. | |
| 4,982,400 A | 1/1991 | Ebersole | |
| 5,551,048 A | 8/1996 | Steely, Jr. | |
| 5,729,756 A | 3/1998 | Hayashi | |
| 6,230,252 B1 | 5/2001 | Passint et al. | |
| 7,043,579 B2 | 5/2006 | Dhong et al. | |
| 7,068,603 B2 | 6/2006 | Rashid et al. | |
| 7,281,055 B2 | 10/2007 | Glasco et al. | |
| 9,152,595 B2 | 10/2015 | Ganasan et al. | |
| 9,317,089 B2 | 4/2016 | Heider et al. | |
| 9,330,002 B2 | 5/2016 | Kessler et al. | |
| 2007/0011639 A1* | 1/2007 | Pitts ...................... | G06F 30/392 |
| | | | 716/52 |
| 2013/0132675 A1 | 5/2013 | Sleiman et al. | |
| 2014/0156929 A1 | 6/2014 | Falsafi et al. | |
| 2015/0006776 A1 | 1/2015 | Liu et al. | |
| 2015/0095688 A1* | 4/2015 | Sugumar ................. | G06F 13/00 |
| | | | 713/500 |

(Continued)

*Primary Examiner* — Zachary K Huson
(74) *Attorney, Agent, or Firm* — The Farrell Law Firm, P.C.

(57) ABSTRACT

A method and apparatus are provided. The apparatus includes a plurality of central processing units, a plurality of core input/output units, a plurality of last level cache memory banks, an interconnect network comprising multiple instantiations of dedicated data channels, wherein each dedicated data channel is dedicated to a memory transaction type, each instantiation of dedicated data channels includes arbitration multiplexors, and each dedicated data channel operates independently of other data channels.

18 Claims, 9 Drawing Sheets

(56) References Cited

U.S. PATENT DOCUMENTS

2015/0095743 A1* 4/2015 Sato .................... H04L 1/0009
714/774
2015/0169017 A1 6/2015 Haider et al.

* cited by examiner

NON-UNIFORM BUS (NUB) INTERCONNECT PROTOCOL FOR TILED LAST LEVEL CACHES

PRIORITY

This application claims priority under 35 U.S.C. § 119(e) to U.S. Provisional Patent Application No. 62/505,313 which was filed in the U.S. Patent and Trademark Office on May 12, 2017, the entire content of which is incorporated herein by reference.

FIELD

The present disclosure relates generally to a cache memory, and more particularly, to a method and apparatus for a non-uniform bus interconnect protocol for tiled last level caches.

BACKGROUND

A last level cache (LLC) in a central processing unit (CPU) is generally sized to hold a few megabytes of data or instruction lines of recent memory accesses to lower the latency of requests from the CPU as compared to memory accesses of dynamic random access memory (DRAM). A cache that stores megabytes of data requires a large physical area and integrated circuit floor planning resources to provide maximum capacity at minimum response latency. In a multi-CPU and multi-LLC memory bank shared cache system, an interconnect network, sometimes referred to as a network-on-chip (NoC), is capable of high bandwidth between a master CPU and LLC memory banks but exponentially expands wire, power, timing, and area requirements for each instantiation of CPU and LLC memory bank.

An integrated circuit system design may prefer blocks such as CPUs or LLC memory banks to be as uniform and "tile-able" as possible, meaning by designing one module and repeating instantiations or tiling several identical copies adjacent to the original resulting in a desired configuration. For large LLC memory systems, a tile-able or modular LLC memory bank design may be incorporated in multiple product configurations with minimum re-design if the LLC's memory protocol is also tile-able and modular.

Common solutions may include full ring busses, meshes and direct end-to-end wires, where each solution balances system complexity, power consumption, die area, wire cost, scalability, and selective memory coherence requirements. While high-end server systems have high-complexity, high-power solutions (e.g., rings, meshes, and switches) and low-end designs have low-complexity, non-scalable solutions (e.g., end-to-end dedicated connections), there is a need for a solution for CPU systems for mobile devices (e.g., in a mid-range of 1 to 8 nodes (CPUs)) with low-power consumption, mid-range complexity, and mid-range bandwidth requirements while achieving tile-ability.

SUMMARY

According to an aspect of the present disclosure, an apparatus is provided which includes a plurality of central processing units, a plurality of core input/output units, a plurality of last level cache memory banks, an interconnect network comprising multiple instantiations of dedicated data channels, where each dedicated data channel is dedicated to a memory transaction type, each instantiation of dedicated data channels includes arbitration multiplexors, and each dedicated data channel operates independently of other data channels.

According to another aspect of the present disclosure, a method is provided which includes operating, independently, each dedicated data channel of an interconnect network comprising multiple instantiations of dedicated data channels, wherein each dedicated data channel is dedicated to a memory transaction type, each instantiation of the dedicated data channels includes arbitration multiplexors and each instantiation of the dedicated data channels is connected to a plurality of central processing units, a plurality of core input/output units, and a plurality of last level cache memory banks.

According to another aspect of the present disclosure, a method of manufacturing a processor is provided which includes forming the processor as part of a wafer or a package that includes at least one other processor, wherein the processor is configured to independently operate each dedicated data channel of an interconnect network comprising multiple instantiations of dedicated data channels, wherein each dedicated data channel is dedicated to a memory transaction type, each instantiation of the dedicated data channels includes arbitration multiplexors and each instantiation of the dedicated data channels is connected to a plurality of central processing units, a plurality of core input/output units, and a plurality of last level cache memory banks.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor configured to independently operate each dedicated data channel of an interconnect network comprising multiple instantiations of dedicated data channels, wherein each dedicated data channel is dedicated to a memory transaction type, each instantiation of the dedicated data channels includes arbitration multiplexors and each instantiation of the dedicated data channels is connected to a plurality of central processing units, a plurality of core input/output units, and a plurality of last level cache memory banks.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to "when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
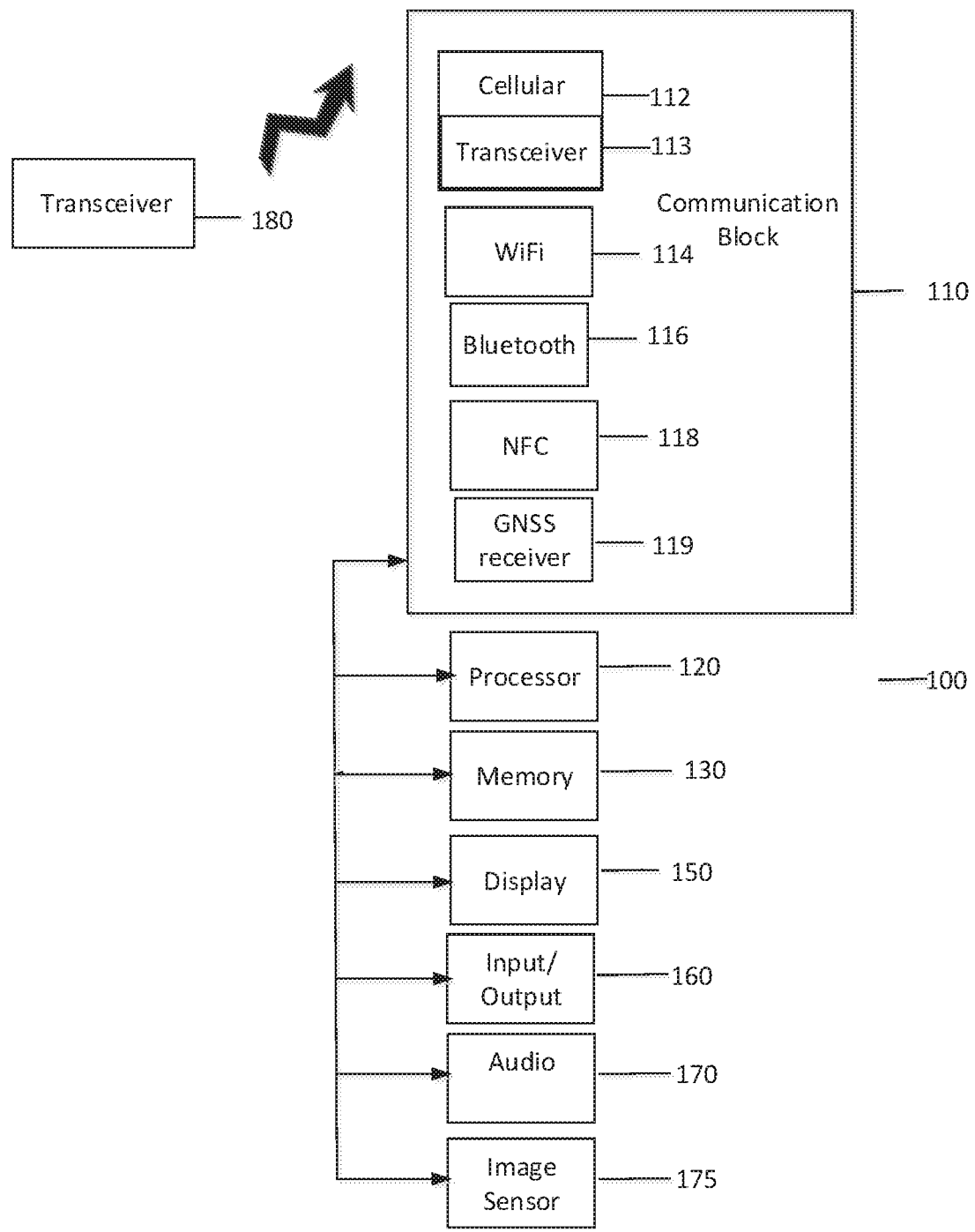
FIG. 1 illustrates an exemplary block diagram of an electronic device in a communication network, according to one embodiment.

FIG. 1 illustrates an exemplary block diagram of an electronic device in a network environment, according to one embodiment.

Referring to FIG. 1, an electronic device 100 includes, but is not limited to, a communication block 110, a processor 120, a memory 130, a display 150, an input/output block 160, an audio block 170, an image sensor 175 and a wireless transceiver 180. The wireless transceiver 180 may be included in a vehicle, an access point, a mobile electronic device or a cellular base station (such as an eNodeB) and includes, but is not limited to, a wireless transmitter and receiver.

The electronic device 100 includes a communication block 110 for connecting the device 100 to another electronic device or a network for communication of voice and data. The communication block 110 provides general packet radio service (GPRS), LTE, enhanced data rates for GSM evolution (EDGE), cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT), V2X and short range communications.

The functions of the communication block 110, or a portion thereof including a transceiver 113, may be implemented by a chipset. In particular, the cellular communications block 112 provides a wide area network connection through terrestrial base transceiver stations or directly to vehicle or other electronic devices, using technologies such as second generation (2G), GPRS, EDGE, D2D, M2M, LTE, fifth generation (5G), long term evolution advanced (LTE-A), code division multiple access (CDMA), wideband code division multiple access (WCDMA), universal mobile telecommunications system (UMTS), wireless broadband (Wi-Bro), V2X and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth® communications block 116 provides personal area direct and networked communications using technologies such as IEEE 802.15 and Bluetooth™ low energy (BLE) long range (LR). The near field communications (NFC) block 118 provides point to point short range communications using standards such as ISO/IEC 14443. The communication block 110 also includes a GNSS receiver 119. The GNSS receiver 119 supports receiving signals from a satellite transmitter.

The electronic device 100 may receive electrical power for operating the functional blocks from a power supply, including, but not limited to, a battery. The wireless transceiver 180 may be a part of a terrestrial base transceiver station (BTS) (such as a cellular base station) and include a radio frequency transmitter and receiver conforming to third generation partnership project (3GPP) standards. The wireless transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112 or Bluetooth® block 116.

The memory 130 provides storage for device control program code, user data storage, application code and data storage. The memory 130 may provide data storage for the firmware, libraries, databases, lookup tables, algorithms, methods, and NUB interconnect protocols. The program code and databases required by the cellular communications block 112 or Bluetooth® block 116 may be loaded into local storage from the memory 130 upon device boot up. The cellular communications block 112 or Bluetooth® block 116 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The wireless transceiver 180 may be included in an access point or base station that is used to receive, transmit or relay wireless signals. The wireless transceiver 180 may facilitate communication with the electronic device 100 by sending, receiving, and relaying data communication signals to and from the electronic device 100. The electronic device 100 may be connected to a network through the wireless transceiver 180. For example, the wireless transceiver 180 may be an access point, a cell tower, a wireless router, an antenna, multiple antennas, or a combination thereof being used to send signals to, or receive signals from, the electronic device 100, such as a smartphone. The wireless transceiver 180 may relay the wireless signals through the network to enable communication with other electronic devices 100 such as user equipment (UE), vehicles, servers or a combination thereof. The wireless transceiver 180 may be used to transmit the communication signals, such as voice or data.

According to one embodiment, a multi-CPU core system includes multiple CPUs coupled to a system interconnect, each CPU is supported by a multi-level cache memory hierarchy, the lower level(s) of which may be shared by one or more CPUs.

Cache memories are commonly utilized to temporarily store memory blocks that might be accessed by a CPU in order to increase processing speed by reducing memory access latency introduced by having to load data and instructions from system memory. In multi-CPU systems, the cache hierarchy may include multiple levels. In response to a memory access instruction such as a load or store instruction, the CPU may first access a directory of the last-level caches. If the requested memory block is not found in the last-level cache, the CPU then accesses neighboring caches of the other CPUs for the requested memory block.

Multiple CPUs may request write access to the same cacheline of data and modified cachelines may not be immediately synchronized with system memory. Therefore, the cache hierarchies of multi-CPU systems may implement a cache memory coherency protocol to ensure at least a minimum level of coherence among the CPUs' view of the contents of system memory. In particular, cache memory coherency requires that after a CPU accesses a copy of a memory block and subsequently accesses an updated copy of the memory block, the CPU cannot again access the out of date copy of the memory block. A cache memory coherency protocol may define a set of cache states stored in association with the cachelines of each cache hierarchy, as well as a set of coherency messages used to communicate the cache state information between cache hierarchies.

The present disclosure describes an LLC shared cache memory interconnect (herein referred to as a non-uniform bus (NUB)) that balances complexity, bandwidth, and wire interconnects by dedicating shared, stall-able, dual-direction ports for each memory transaction class allowing for independent and non-uniform performance between transaction types in a cache coherent and tile-able modular design. A tile-able design is one in which each instantiation of the NUB may be placed next to, and be connected with, another identical instantiation of the NUB on an integrated circuit. The independent performance allows a read transaction to occur independently of a write transaction and a write transaction to occur independently of a read transaction. The NUB protocol may be a tile-able interconnect network that allows a read operation, a write operation, and a response to each segment of travel on independent network channels with unique latency, bandwidth, and stall protocols. The latency, bandwidth, and stall protocols are unique to each type of transaction, i.e., the read transaction type has a unique set of protocols for all read transactions in the system, while the write transaction type has a unique set of protocols for all write transactions in the system, where the protocols may have a different set of latency/bandwidth/stall mechanisms.

The NUB does not require cross-channel awareness or a content addressable memory for coherency. Instead, the NUB relies on start and endpoints. The start and endpoints for each transaction may be any of the CPU cores, higher level cache memories, LLC memory banks, and external ports, each of which send and receive handshake signals to guarantee coherence ordering on colliding addresses. An example of colliding addresses is when a CPU executes a write transaction to an LLC memory bank with a cacheline address of hexadecimal address 0x4000, before cacheline 0x4000 is written to the LLC memory bank, the CPU executes a read transaction to read 0x4000 back immediately. Since the present disclosure has completely independent channels, a hazard exists in which the read transaction is executed before the write transaction is executed and the CPU reads incorrect data. Therefore, the CPU is required, on matching addresses, to themselves protect against un-responded transactions sent by the CPU and upon detection of a same-address hazard, wait for a handshake signal to indicate completion of the transaction. The NUB protocol does not require transactions to continuously move on the network for forward progress (forward progress ensures each cache is properly updated in a write operation). Instead, the NUB protocol allows the forward progress transaction to stall, or bypass around other transactions as necessary, in order to reduce power consumption.

According to one embodiment, the present system provides an interconnection between CPU cores, LLC memory banks, and external ports. The NUB interconnect provides shared buses in a pseudo-ring topology. The NUB interconnect provides slices that are each a single instantiation of various channels between various macro level blocks such as CPU endpoints, LLC memory banks or external ports that may be tiled together by abutment on an integrated circuit die in any desired configuration or number. The present disclosure describes four slices as an example, but is not limited to such. Most of the channels may move data or control bidirectionally using shared or dedicated signal lines. However, a few channels may move data unidirectionally. The NUB may be referred to as a pseudo-ring as it performs transactions in steps toward its destination, but not around in a ring. If a transaction cannot be executed by an endpoint, it stalls the bus and subsequent transactions wait until the transaction executes. If the endpoint of the transaction is to the right of the originating slice, the transaction travels to the right. If the endpoint of the transaction is to the left of the originating slice, the transaction travels to the left. A differentiating aspect of the present disclosure as compared to the conventional art is that a transaction which reaches the leftmost slice will not circle back around to the rightmost slice as in a ring architecture. Similarly, a transaction which reaches the rightmost slice will not circle back around to leftmost slice.

According to one embodiment, the NUB allows transactions on each channel to flow independently of transactions on other channels. The independent transactions allow any channel to backpressure, stall, or even bypass older transactions on other channels without the use of content addressable memory. The NUB protocol configuration may require more signal lines and additional handshaking protocols as compared to a universal ring bus or packetized switch protocol. However, the NUB protocol has the benefit of allowing stalls, fine-tuning the performance of specific channels (e.g., via a fairshare method) differently than other channels, local credit loops, a unique forward progress mechanism, and a reduced protocol complexity.

Figure 2:
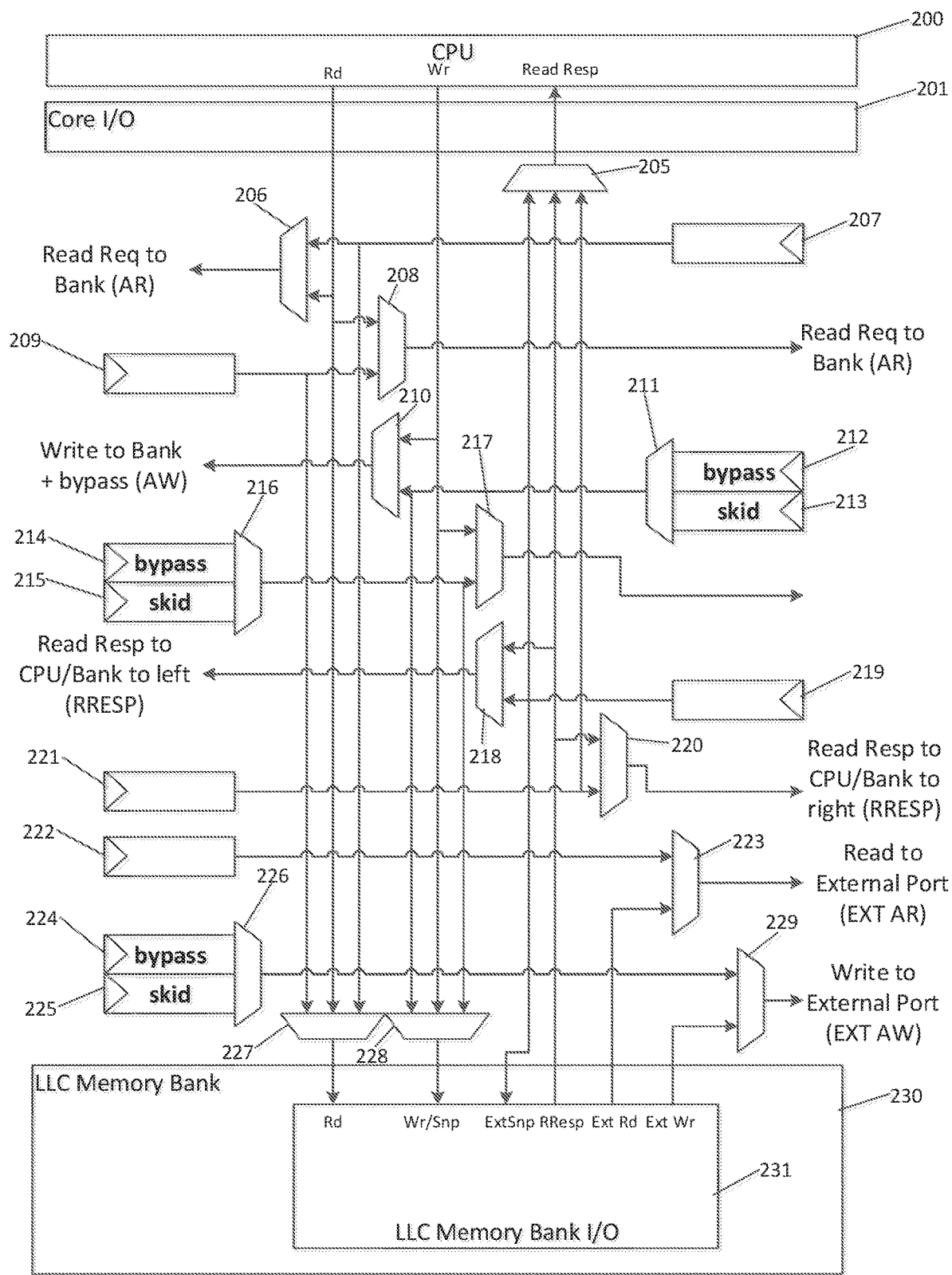
FIG. 2 illustrates a block diagram of an NUB interconnection network, according to one embodiment.

FIG. 2 illustrates a block diagram of an NUB interconnection network, according to one embodiment. The NUB may have multiple dedicated channels for each transaction type per slice. The NUB interconnection network includes multiple buses which include a read request (AR) channel from CPU 200 to LLC memory bank 230, and a write and internal snoop response (AW/CR) channel from CPU 200 to LLC memory bank 230. Snooping is a process where each of the LLC memory banks monitors address lines for accesses to memory locations that they have cached in order to maintain coherency. Normal writes and snoop responses may forward around pending write line unique (WLU)/write unique (WU) write transaction. WLU/WU write transactions also travel on the AW channel. WLU and WU are transactions that write without first reading—i.e., a CPU sends data to write to an address without considering the data that was previously stored. The WLU and WU transactions do not require forward progress to avoid a deadlock condition.

Read response (RRESP) is an output from multiplexer (mux) 218 which has buffers 219 and 221 as inputs. Buffer 221 is a read response from a DRAM/external port which is to the right in an adjacent NUB slice. Buffer 219 is a read response from LLC memory bank I/O 231. Since FIG. 2 illustrates one NUB tiled slice, the read response propagates to the left through mux 218 or to the right through mux 220, if the read response has not reached the specific CPU in the slice that requested it, it will continue on this channel to the adjacent tile until it reaches the specified CPU. Mux 205 selects a read response from one of the LLC memory bank I/O 231, the left-to-right read response buffer 221 or the right to left read response buffer 219. The read response selected by mux 205 is provided to CPU 200 through core I/O 201.

Buffer 222 provides an external read request signal from an LLC memory bank in an adjacent NUB slice. Mux 223 selects between the external read request from buffer 222 and an external read request from LLC memory bank I/O 231. The output from mux 223 is a read request to an external port.

Mux 226 selects between bypass buffer 224 and skid buffer 225. The inputs to bypass buffer 224 and skid buffer 225 is the write address and snoop response (EXT AW/CR) channel from an LLC memory bank in adjacent NUB slice. Mux 229 selects between the output of mux 226 and the external write of the LLC memory bank I/O 231. The output of mux 229 is provided to external memory (e.g., DRAM) or an external port.

Mux 211 selects between bypass buffer 212 and skid buffer 213. The inputs to bypass buffer 212 and skid buffer 213 is a write transaction to an LLC memory bank channel traveling from right to left from an adjacent NUB slice. Mux 210 selects between the output of mux 211 and a write signal from CPU 200.

Mux 216 selects between bypass buffer 214 and skid buffer 215. The inputs to bypass buffer 214 and skid buffer 215 is a write transaction to an LLC memory bank channel traveling from left to right from an adjacent NUB slice. Mux 217 selects between the output of mux 216 and a write signal from CPU 200.

Mux 206 selects between buffer 207 which is a read request from an LLC memory bank channel traveling from right to left from an adjacent slice and a read signal from CPU 200. Mux 208 selects between buffer 209 which is a read request from an LLC memory bank channel traveling from left to right from an adjacent NUB slice and a read signal from CPU 200.

Mux 227 selects between buffer 209 which is a read request from an LLC memory bank channel traveling from left to right from an adjacent NUB slice, a read signal from CPU 200 and buffer 207 which is a read request from an LLC memory bank channel traveling from right to left from an adjacent NUB slice. The selected output of mux 227 is a read signal to LLC bank I/O 231.

Mux 228 selects between the output of mux 211, which is a write transaction to an LLC memory bank channel traveling from right to left from an adjacent NUB slice, a write signal from CPU 200 and the output of mux 216, which is a write transaction to an LLC memory bank channel traveling from left to right from an adjacent NUB slice. The selected output of mux 228 is a write signal to LLC bank I/O 231.

A memory barrier may be used by CPU 200 to enforce an ordering constraint on memory transactions issued before and after the barrier instruction. Barrier responses are handshake acknowledgements associated with a write transaction provided by CPU 200 or LLC memory bank 230 to another LLC memory bank or an external DRAM. Barrier responses are provided on an NUB channel and provide acknowledgements that responsibility for maintaining coherency of a cache line has been passed to a lower level agent which is responsible for ensuring that coherency. Implementing memory barriers requires signals including bank write barrier response from LLC memory banks to CPUs, bank RAW release from LLC memory banks to CPUs and an EXT write barrier response from external ports to LLC memory banks.

Figure 3:
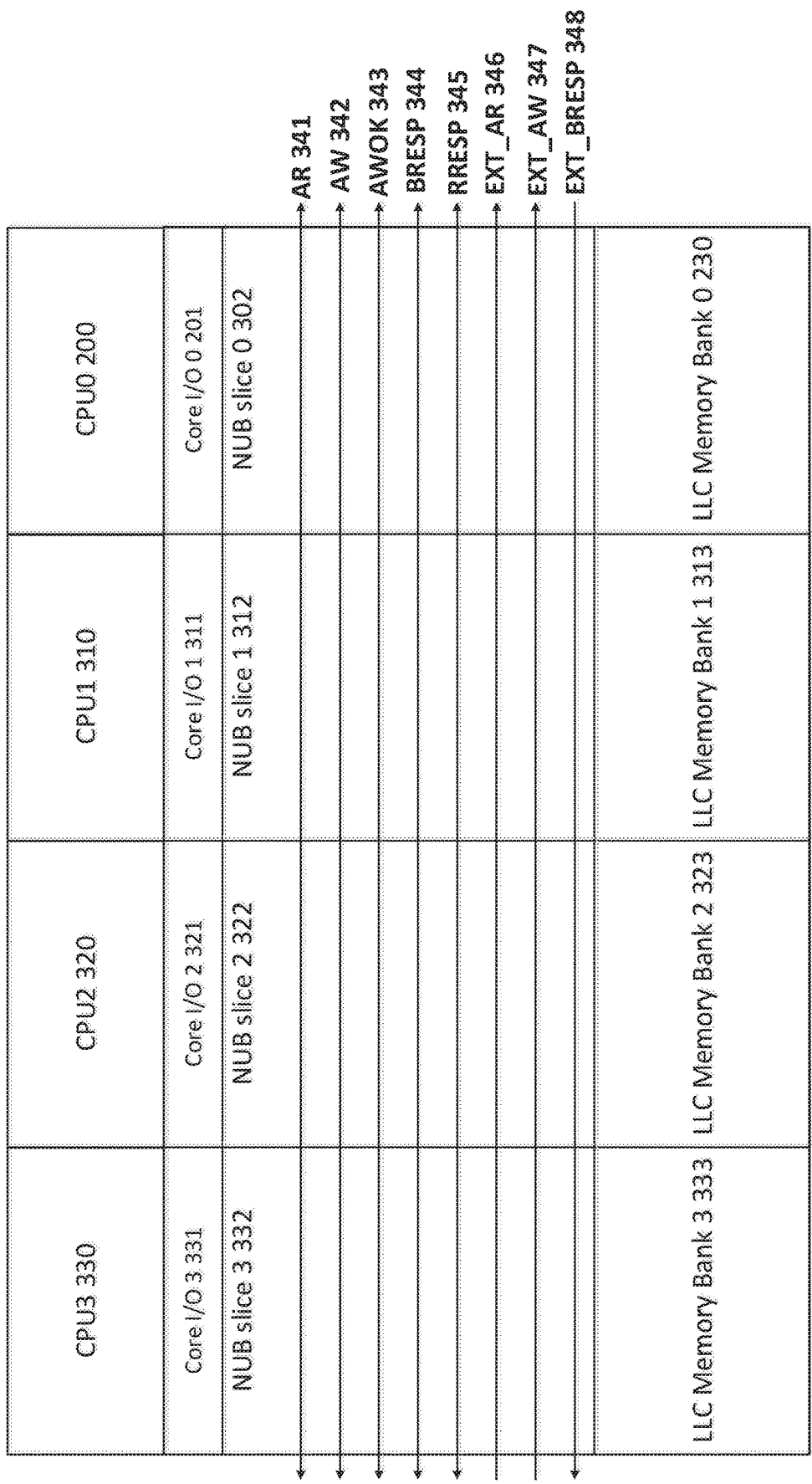
FIG. 3 illustrates a block diagram of buses included in an NUB interconnection network, according to one embodiment.

FIG. 3 illustrates a block diagram of buses included in an NUB interconnection network, according to one embodiment.

Referring to FIG. 3, the NUB interconnection network includes four CPUs including CPU0 200, CPU1 310, CPU2 320, and CPU3 330, four core I/Os including core I/O 0 201, core I/O 1 311, core I/O 2 321, core I/O 3 331, four NUB slices including NUB slice 0 302, NUB slice 1 312, NUB slice 2 322, and NUB slice 3 332, and four LLC memory banks including LLC memory bank 0 230, LLC memory bank 1 313, LLC memory bank 2 323, and LLC memory bank 3 333. The NUB interconnection network also includes channels AR 341, AW 342, AWOK 343, BRESP 344, RRESP 345, EXT_AR 346, EXT_AW 347, EXT_BRESP 348. AR 341 is a read request channel between CPU 200, 310, 320, and 330 and LLC memory banks 230, 313, 323, and 333. AW 342 is a write and internal snoop response channel between CPU 200, 310, 320, and 330, and LLC memory banks 230, 313, 323, and 333. AWOK 343 is read after write (RAW) hazard release channel between CPU 200, 310, 320, and 330, and LLC memory banks 230, 313, 323 and 333. A RAW hazard may occur when a CPU core attempts to read a cache line before an earlier instruction writes to that cache line. BRESP 344 is a bank write barrier response between CPU 200, 310, 320, and 330 and LLC memory banks 230, 313, 323, and 333. RRESP 345 is a read response and snoop request channel between external ports and CPU 200, 310, 320, and 330, and LLC memory banks 230, 313, 323, and 333. EXT_AR 346 is a read miss channel between LLC memory banks 230, 313, 323 and 333 and external ports. EXT_AW 347 is an external write and external snoop response channel between LLC memory banks 230, 313, 323, and 333 and external ports or DRAM memory. EXT_BRESP 348 is a write barrier response channel from external ports and DRAM memory to LLC memory banks 230, 313, 323, and 333.

According to one embodiment, CPU CPU0 200, CPU1 310, CPU2 320 and CPU3 330 may interface to external I/O ports and LLC memory banks 230, 313, 323 and 333 though core I/O 201, 311, 321 and 331. The NUB slices 302, 312, 322, and 332 are tile-able slices that connect to adjacent slices by abutment on an integrated circuit die to support up to 8 configuration endpoints including the four CPU 200, 310, 320, and 330 and the four LLC memory banks 230, 313, 323 and 333. Within each NUB slice 302, 312, 322, and 332, the NUB channels operate independently of one another.

Figure 4:
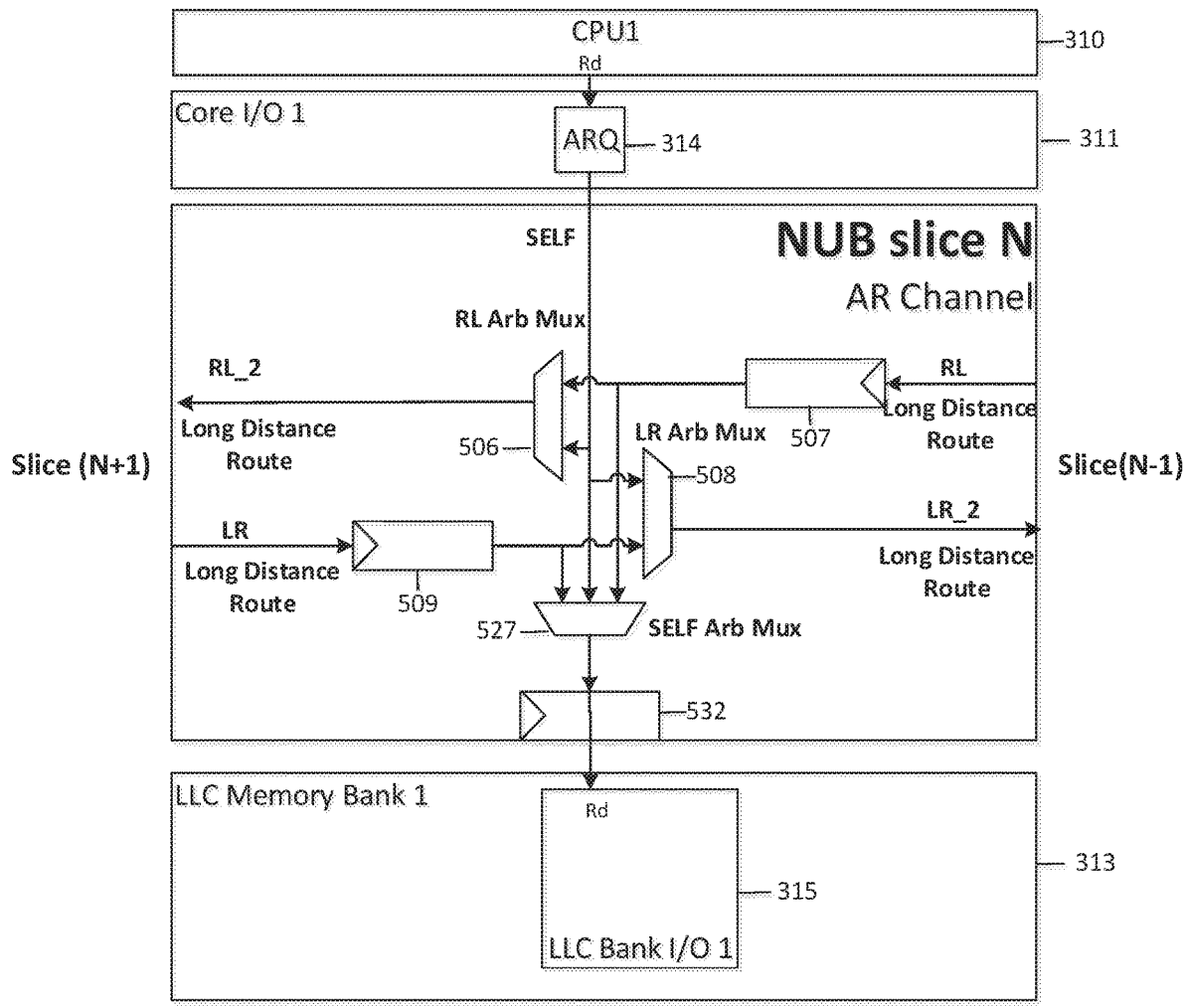
FIG. 4 illustrates a block diagram of an AR read request channel in a single NUB slice, according to one embodiment.

FIG. 4 illustrates a block diagram of an AR read request channel in a single NUB slice, according to one embodiment.

Referring to FIG. 4, the specific channel shown within the single NUB slice is an AR read request channel. CPU 1 310 provides a read signal to ARQ 314 in core I/O 1 311. Right-to-left mux (RL) 506 selects between the read signal from ARQ 314 and the read signal traveling from right to left in RL skid buffer 507. Left-to-right mux 508 selects between the read signal from ARQ 314 and the read signal traveling from left to right in buffer 509. In order to access cachelines in LLC memory bank 1 313, mux 527 selects a read request signal coming from left to right in buffer 509, right to left in RL skid buffer 507, or from ARQ 314. The read request selected by mux 527 is provided through buffer 532 to LLC bank I/O 1 315.

Figure 5:
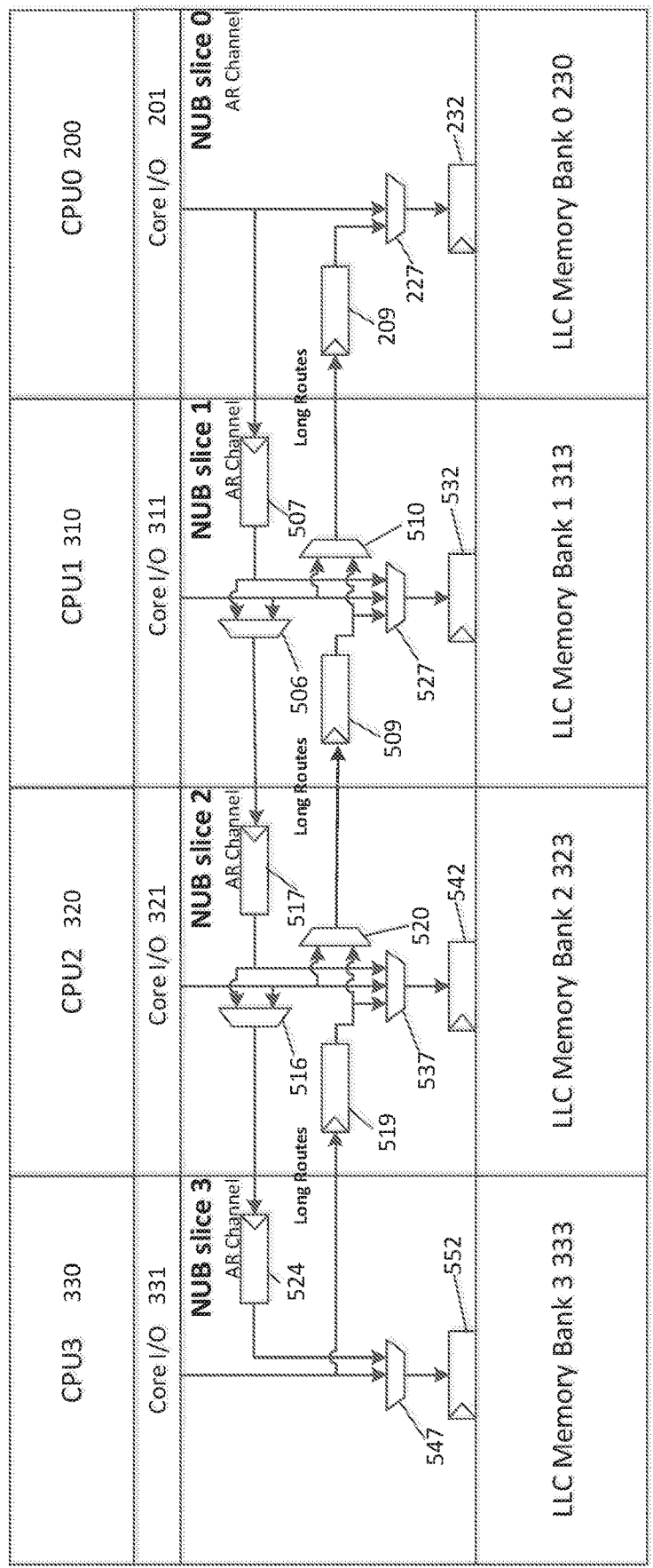
FIG. 5 illustrates a block diagram of an AR read request channel in an NUB interconnection network with four tiled NUB slices, according to one embodiment.

FIG. 5 illustrates a block diagram of an AR read request channel in an NUB interconnection network with four tiled NUB slices, according to one embodiment.

Referring to FIG. 5, each NUB slice has arbitration muxes for selecting the data on a bus vs. data coming from a CPU or an LLC memory bank. Each mux has a local fairshare policy and operates independently of the other arbitration muxes. The arbitration muxes are the left-to-right (LR) muxes 510 and 520, the RL muxes 506 and 516, and the self muxes 547, 537, 527 and 227. The LR mux 510 allows transactions to move from NUB slice 1 to NUB slice 0 which may have originated in NUB slice 1, 2 or 3. The LR mux 520 allows transactions to move from NUB slice 2 to NUB slice 1 which may have originated in NUB slice 2 or 3. Similarly, the RL mux 506 allows transactions to move from NUB slice 1 to NUB slice 2 which may have originated in NUB slice 0 or 1. The RL mux 516 allows transactions to move from NUB slice 2 to NUB slice 3 which may have originated in NUB slice 0, 1 or 2. The self muxes 547, 537, 527 and 227 allows transactions arriving at or originating in NUB slice N to occur in LLC memory bank N. In particular, self mux 547 in NUB slice 3 allows transactions in LLC memory bank 3 333 by selecting data from one of two sources including core I/O 331 or right-to-left skid buffer 524. The read request selected by mux 547 is provided through buffer 552 to LLC memory bank 3 333. Self mux 537 in NUB slice 2 allows transactions in LLC memory bank 2 by selecting data from one of three sources including left-to-right skid buffer 519, core I/O 321 or right-to-left skid buffer 517. The read request selected by mux 537 is provided through buffer 542 to LLC memory bank 2 323. Self mux 527 in NUB slice 1 allows transactions in LLC memory bank 1 by selecting data from one of three sources including left-to-right skid buffer 509, core I/O 311, or RL skid buffer 507. The read request selected by mux 527 is provided through buffer 532 to LLC memory bank 1 313. Self mux 227 in NUB slice 0 allows transactions in LLC memory bank 0 by selecting data from one of two sources including left-to-right skid buffer 209, or core I/O 201. The read request selected by mux 227 is provided through buffer 232 to LLC memory bank 0 230.

Skid buffers are included on the bus for both timing purposes and temporary storage. A skid buffer is used to allow additional transaction requests to be queued in order to remove a blockage of a transaction request and end a deadlock condition. The skid buffers contain memory storage to store control information and data. Write transactions (AW) and snoop responses (CR) have addresses and control information and data that need to be stored and bypassed to avoid a deadlock condition. Read request (AR) channels do not carry data, only control addresses of the location of the data to be read. The skid buffers have a request/accept protocol which is communicated with a previous repeater stage, the LLC memory banks and the CPU cores. The request/accept protocol are the local credit loops. A skid buffer may request information to determine if storage space is available in a buffer of an adjacent NUB slice, an acknowledgement to the request indicates if the requested storage space is available. The request/accept protocol enables communication among the skid buffers to control the use and release of storage resources. Each skid buffer has cacheline storage, and a bypass/forwarding/repeater stage. The AW and CR channels avoid deadlock conditions and allow forward progress of transactions around WLU/WU transactions that don't require ordering until they reach their destination. When a transaction arrives at a skid buffer, the AW and CR channels specifically allow forward progress by bypassing one transaction over another should it be necessary. RRESP and AR channels do not need such functions. The repeater stages are used to store a transaction to allow for a pipelining or frequency goal to be met along long routes. Long routes are those transactions that occur across NUB slices. Referring to FIG. 5, NUB slice 2 includes LR skid buffer 519 for transactions directed from NUB slice 3 to NUB slice 2. NUB slice 1 includes LR skid buffer 509 for transactions directed from NUB slice 2 to NUB slice 1. NUB slice 0 includes LR skid buffer 209 for transactions directed from NUB slice 1 to NUB slice 0. NUB slice 1 includes RL skid buffer 507 for transactions directed from NUB slice 0 to NUB slice 1. NUB slice 2 includes RL skid buffer 517 for transactions directed from NUB slice 1 to NUB slice 2. NUB slice 3 includes RL skid buffer 524 for transactions directed from NUB slice 2 to NUB slice 3.

Figure 6:
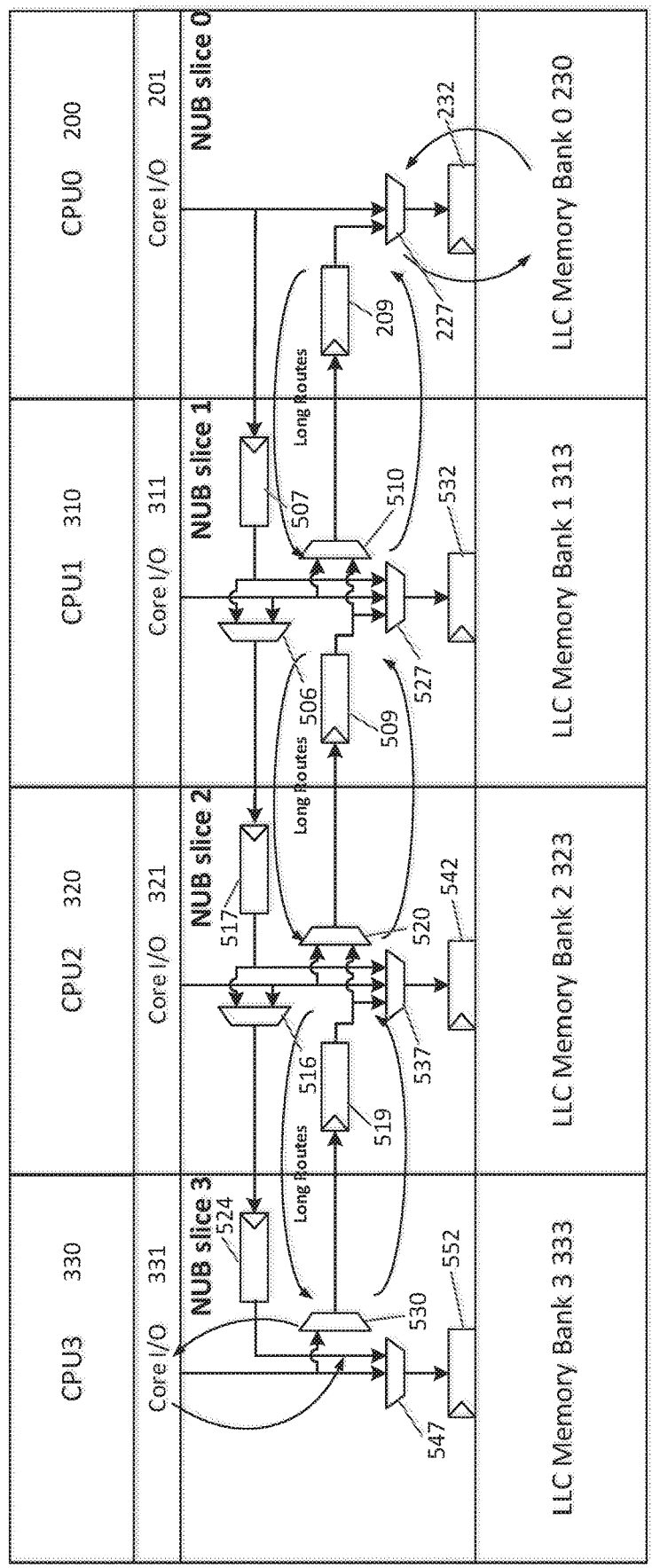
FIG. 6 illustrates an exemplary diagram of NUB AR read request channel credit loops, according to one embodiment.

FIG. 6 illustrates an exemplary diagram of NUB AR read request channel credit loops, according to one embodiment.

Referring to FIG. 6, the arched arrows indicate credit loops between blocks. Credit loops are a mechanism to apply back pressure and prevent a deadlock condition. In implementing credit loops, two different blocks trying to send each other transactions need to determine how many resources the other block has in order to prevent a deadlock condition. A block may request resources from another block which responds with an indication of available resources. The time required for the request/response contributes to loop latency and has implications on performance.

The mux arbitration logic only uses credit loops with their immediate source and neighbor slice. A neighbor slice is the NUB slice(s) that are physically adjacent to each other on a die of an integrated circuit which implements the NUB protocol of the present disclosure. The immediate source may be CPU 0 to CPU 3 or LLC memory bank 0 to LLC memory bank 3. The neighbor slice may be the adjacent NUB slice. NUB slice 0 may use credit loops with adjacent NUB slice 1. NUB slice 1 may use credit loops with adjacent NUB slice 0 and adjacent NUB slice 2. NUB slice 2 may use credit loops with adjacent NUB slice 1 and adjacent NUB slice 3. NUB slice 3 may use credit loops with adjacent NUB slice 2. The local credit loop reduces the need for large queuing structures that depend on non-neighbor (non-adjacent) destination credit responses at the cost of not observing network traffic through the entire channel.

According to one embodiment, the NUB interconnect network provides forward progress in certain situations to prevent deadlock conditions. The NUB interconnect network acts as a coherent system and provides forward progress on external and internal snoops, read responses, and cacheable write transactions which are being executed. The NUB provides forward progress on the RRESP 345 channel for read responses and snoop requests, and forward progress on the AW 342 channel for cacheable write transaction and snoop responses.

According to one embodiment, the write transactions that make forward progress include evicts (with or without clean data), dirty data write backs, write cleaning operations, and snoop responses. An evict occurs when a block of memory is replaced in the LLC. Write transactions such as writes without ownership or writes outside of coherence domain may not bypass other pending transactions. Write transactions without ownership or writes outside of coherence domain are the WLU and WU transactions that do not read cachelines before writing and proceed outside the forward progress domain until they arrive in a cache that controls the cache line. Ownership is a protocol concept meaning that an LLC memory bank or CPU has permission or semaphore control to write to the cache line. Write transactions that have to make forward progress may bypass non-coherent transactions. WLU/WU transactions or transactions that are declared non-coherent are lower priority transactions and are not required for forward progress. Therefore, NUB channels AW/CR are allowed to bypass non-coherent transactions in order to continue making forward progress. AW/CR transactions bypass non-coherent transactions on the NUB by using a dedicated bypass path in the AW/CR channels themselves. A transaction that is back-pressured resides in a skid buffer until credit loops are available again for all transactions to flow.

Figure 7:
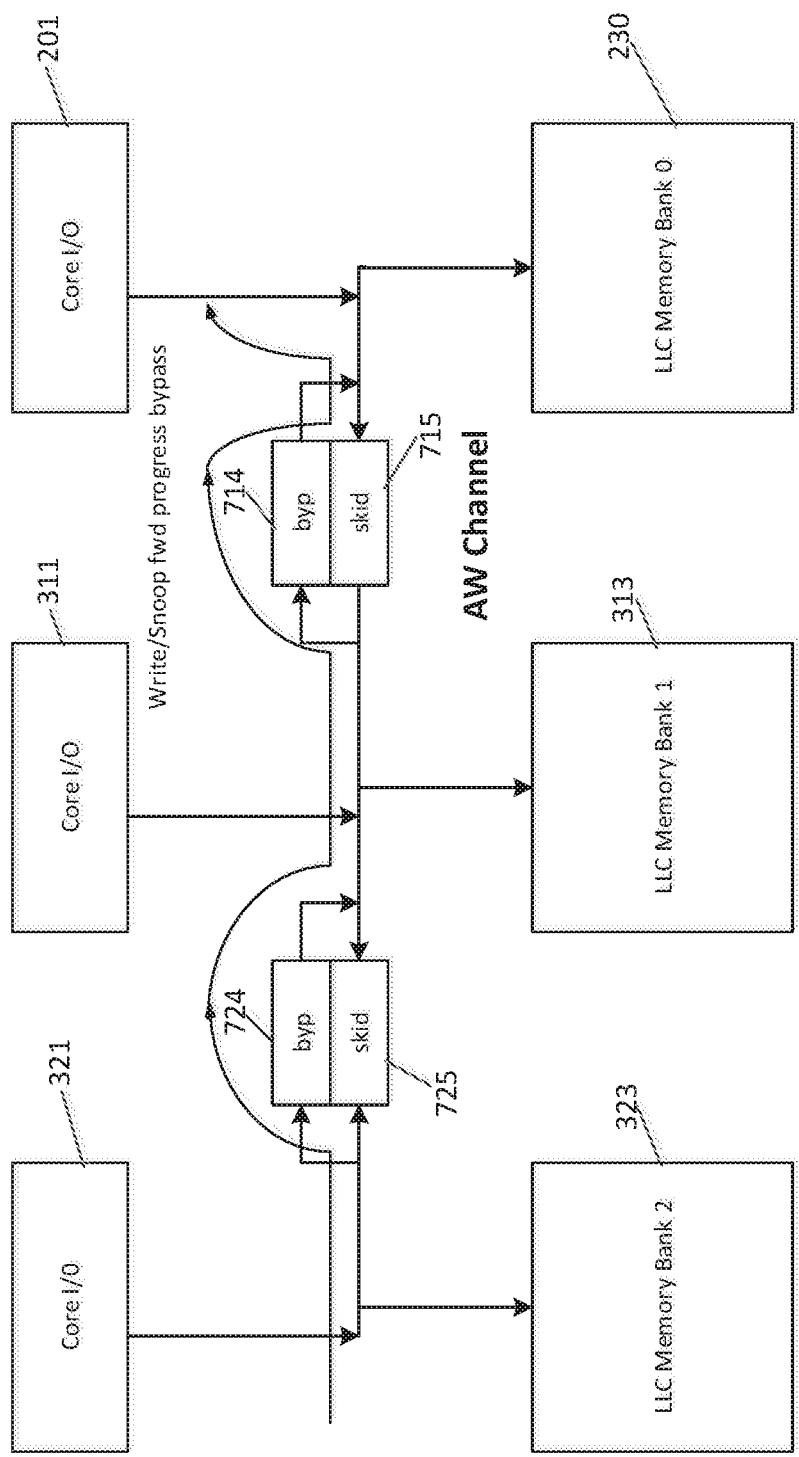
FIG. 7 illustrates an exemplary diagram of forward progress in an AW write channel, according to one embodiment.

FIG. 7 illustrates an exemplary diagram of forward progress in an AW write channel, according to one embodiment.

Referring to FIG. 7, a write transaction makes forward progress over cachelines that may be stalled in skid buffer 725 or skid buffer 715. The RRESP 345 channel shares the channel between read responses and snoop requests (AC). Snoop requests and read responses are ordered. The ordering is controlled by the NUB system to maintain coherency. The CPU, the LLC memory banks, the external DRAM and the channels maintain a coherent protocol which place in order the common addresses seen over time. If a read response is sent first, followed by a snoop request, the order may not be reversed. The requirement for code to execute on the CPUs in time order is maintained. A snoop request that follows a read response needs to find the result in transit and not bypass the read response. The NUB may determine that snoop requests do not bypass read responses by executing their transmission on the same RRESP 345 channel. For example, if an LLC memory bank receives a read request from a CPU and sends a cacheline up to that CPU, an external source may then request the same cacheline shortly afterwards. The read response data to the CPU may be in transit on the NUB, so when the LLC memory bank sends a snoop request regarding the data it just sent on the NUB to the CPU, that snoop request is "chasing" the response which was just sent. It may catch up to the response, but it may not bypass it. Transactions which are allowed to bypass may use bypass buffer 724 or bypass buffer 714.

Similar to normal cacheable write transactions, the start and endpoints of the NUB are configured to prevent deadlocking of read responses, snoop requests, snoop responses, or cacheable write transactions. In order ensure coherency, any read transactions or dependent transactions to the same cacheline address in either the starting point or the endpoint serviced by the NUB temporarily pauses dependent transactions until a handshake is received by the starting point to prevent architectural hazards like read transactions bypassing write transactions (RAW hazards) or write-after-read (WAR hazard) in the NUB which has no content addressable memory. A dependent transaction may operate on the same address as another transaction executing on the NUB. To maintain coherency, they become dependent and not processed until the preceding transaction in time is executed. The handshake executes on the AWOK 343 channel that controls endpoints to hold dependent/same address transactions until an LLC memory bank receives a transaction.

Although the NUB allows for re-ordering of the transactions, they must be controlled so that programs running on the CPUs maintain order of code execution. The AW 342 channel has a write-received signal that uses a fairshare NUB channel to communicate with the CPUs. The AWOK 343 and the BRESP 344 channels, are NUB channels that use fairshare control when two different transactions are attempting to use the same resource, ensuring that they are both serviced in a fairshare manner. A fairshare manner may be implemented by circuits which are available to arbitrate sharing of shared resources by using counters, history or other methods. Barrier responses (BRESP 344) may behave in a similar way, indicating certain coherent transactions (e.g., barrier syncs) may proceed in one of the start or endpoints. The BRESP 344 uses a handshake signal from a lower level cache or system element acknowledging the write transaction in question has crossed the virtual barrier and is controlled by a lower level protocol. A barrier sync is an operation which enables multiple threads to wait until all threads have reached a particular point of execution before any thread continues and requires the CPUs to wait (stall)

until all of its write transactions have been synchronized across the system, which is determined by all barrier responses having been executed.

According to one embodiment, the present system and method includes an NUB interconnect network for tiled last level caches, where the interconnect network is split into multiple slices, each slice including one CPU, one core I/O and one LLC memory bank. Each NUB slice has dedicated channels for each memory transaction type such that each channel operates independently of the other channels and where each dedicated channel for each transaction type does not require cross-channel content addressable memory for coherency. Each NUB slice includes arbitration muxes for selecting data on the bus vs. data coming from an LLC memory bank or a CPU that uses credit loops to forward the read or write transaction to the NUB slice's adjacent neighbor. Each NUB slice allows forward progress for certain transactions using a bypass block such that non-qualified transactions reside in a skid buffer until all transactions are available to flow.

Figure 8:
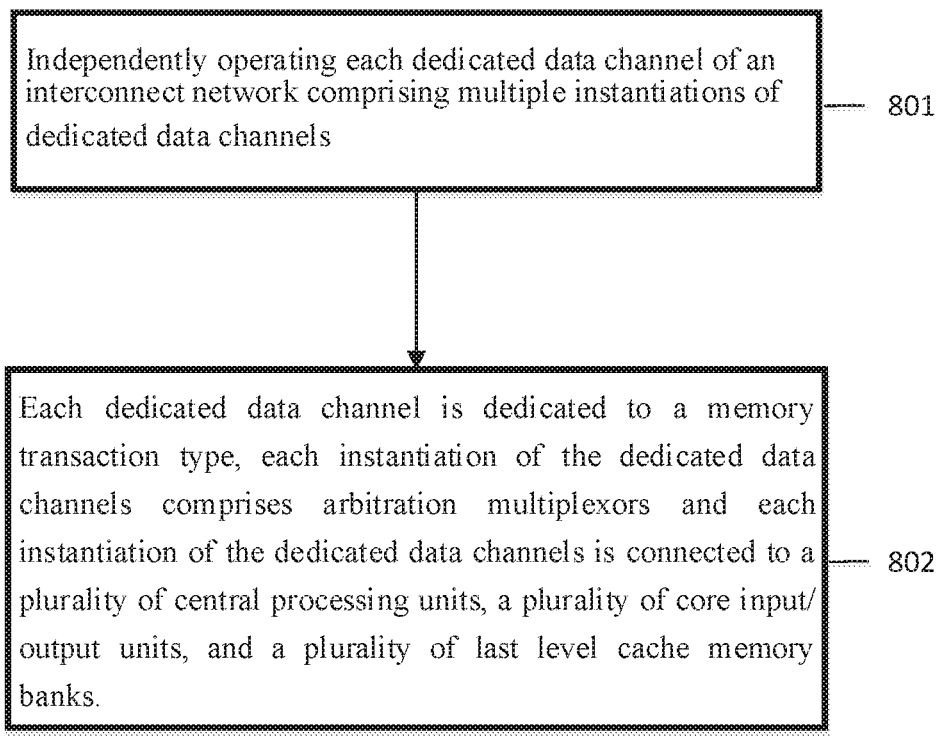
FIG. 8 illustrates an exemplary flowchart of an NUB interconnect protocol, according to one embodiment.

FIG. 8 illustrates an exemplary flowchart of an NUB interconnect protocol method, according to one embodiment.

Referring to the flowchart of FIG. 8, the present method, at 801 independently operates each dedicated data channel of an interconnect network comprising multiple instantiations of dedicated data channels. At 802, each dedicated data channel is dedicated to a memory transaction type, each instantiation of the dedicated data channels includes arbitration multiplexors and each instantiation of the dedicated data channels is connected to a plurality of central processing units, a plurality of core input/output units, and a plurality of last level cache memory banks.

Figures 9, 10:
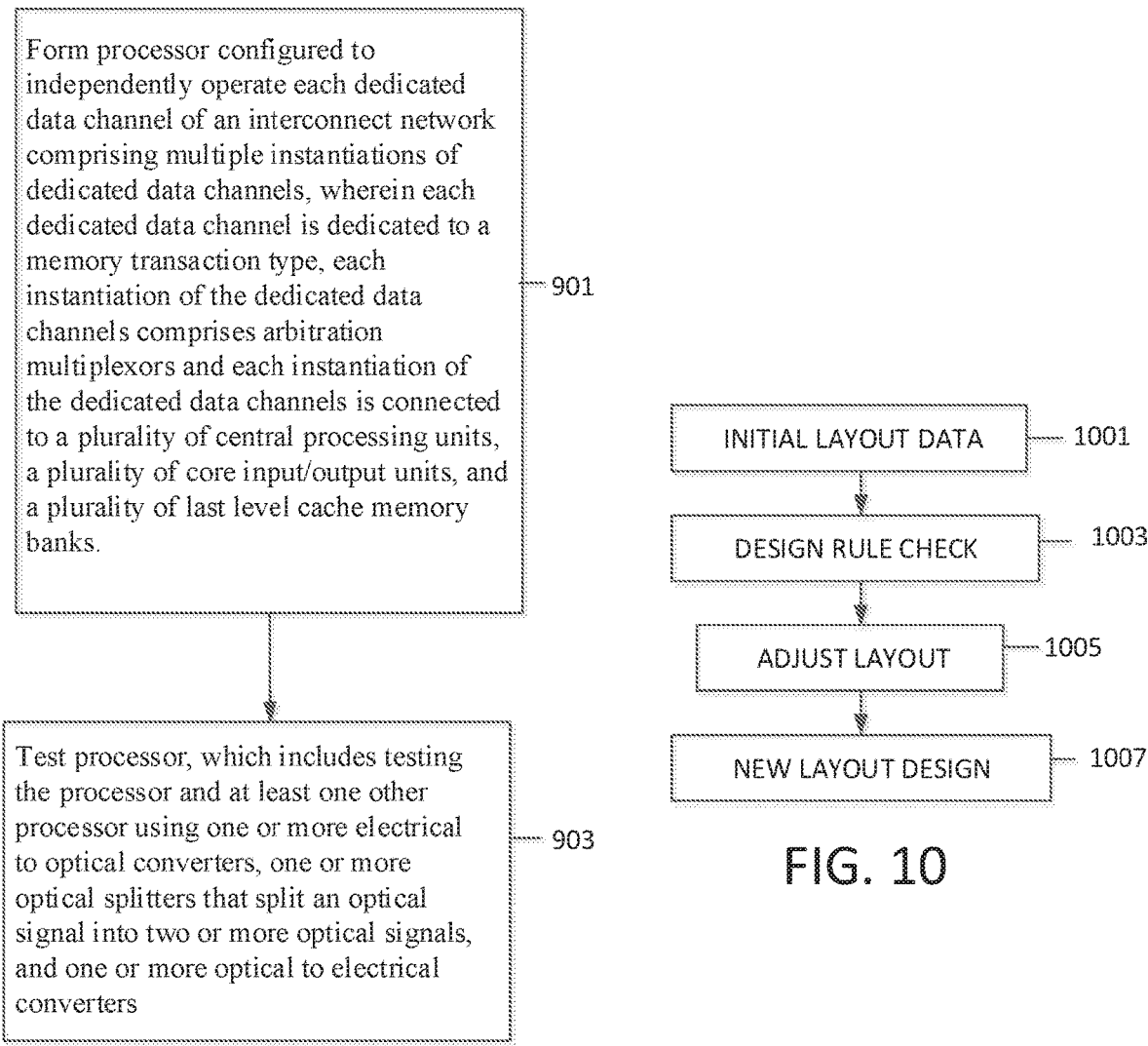
FIG. 9 illustrates an exemplary flowchart of a method of testing a processor of an NUB interconnect protocol, according to one embodiment.
FIG. 10 illustrates an exemplary flowchart of a method of manufacturing a processor of an NUB interconnect protocol, according to one embodiment.

FIG. 9 is a flowchart of a method of testing a processor of an NUB interconnect protocol method, according to one embodiment, where the processor is either implemented in hardware or implemented in hardware that is programmed with software.

Referring to FIG. 9, the method, at 901, independently operates each dedicated data channel of an interconnect network comprising multiple instantiations of dedicated data channels, wherein each dedicated data channel is dedicated to a memory transaction type, each instantiation of the dedicated data channels includes arbitration multiplexors and each instantiation of the dedicated data channels is connected to a plurality of central processing units, a plurality of core input/output units, and a plurality of last level cache memory banks.

At 903, the method tests the processor, which includes testing the processor and the at least one other processor using one or more electrical to optical converters, one or more optical splitters that split an optical signal into two or more optical signals, and one or more optical to electrical converters.

FIG. 10 is a flowchart of a method of manufacturing a processor of the present NUB interconnect protocol, according to one embodiment.

Referring to FIG. 10, the method, at 1001, includes an initial layout of data in which the method generates a mask layout for a set of features for a layer of an integrated circuit. The mask layout includes standard cell library macros for one or more circuit features that include a processor. The processor is configured to independently operate each dedicated data channel of an interconnect network comprising multiple instantiations of dedicated data channels, wherein each dedicated data channel is dedicated to a memory transaction type, each instantiation of the dedicated data channels includes arbitration multiplexors and each instantiation of the dedicated data channels is connected to a plurality of central processing units, a plurality of core input/output units, and a plurality of last level cache memory banks.

At 1003, there is a design rule check in which the method disregards relative positions of the macros for compliance to layout design rules during the generation of the mask layout.

At 1005, there is an adjustment of the layout in which the method checks the relative positions of the macros for compliance to layout design rules after generating the mask layout.

At 1007, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. An apparatus, comprising:
   a plurality of central processing units;
   a plurality of core input/output units;
   a plurality of last level cache memory banks;
   an interconnect network comprising multiple instantiations of dedicated data channels, wherein each dedicated data channel is dedicated to a memory transaction type,
   each instantiation of dedicated data channels comprises arbitration multiplexors, and
   each dedicated data channel operates independently of other dedicated data channels,
   wherein the arbitration multiplexors include right-to-left multiplexors, left-to-right multiplexors and self multiplexors and each of the arbitration multiplexors implements a fairshare policy.

2. The apparatus of claim 1, wherein each of the plurality of last level cache memory banks maintains coherency.

3. The apparatus of claim 1, wherein each of the instantiations of dedicated data channels is tiled adjacent to another instantiation of dedicated data channels on an integrated circuit.

4. The apparatus of claim 3, wherein each of the instantiations of dedicated data channels uses credit loops to forward memory transactions to an adjacent instantiation of dedicated data channels.

5. The apparatus of claim 1, wherein each instantiation of the dedicated data channels controls forward progress for memory transactions using a bypass block.

6. The apparatus of claim 4, wherein non-qualified transactions are stored in a skid buffer until all the memory transactions are available to flow.

7. The apparatus of claim 1, wherein each of the plurality of last level cache memory banks maintains coherency without content addressable memory.

8. The apparatus of claim 1, wherein the interconnect network is configured to maintain order of instructions executed in the plurality of central processing units.

9. A method, comprising:
operating, independently, each dedicated data channel of an interconnect network comprising multiple instantiations of dedicated data channels, wherein each dedicated data channel is dedicated to a memory transaction type, each instantiation of the dedicated data channels comprises arbitration multiplexors and each instantiation of the dedicated data channels is connected to a plurality of central processing units, a plurality of core input/output units, and a plurality of last level cache memory banks, and
wherein the arbitration multiplexors include right-to-left multiplexors, left-to-right multiplexors, and self multiplexors and each of the arbitration multiplexors implements a fairshare policy.

10. The method of claim 9, further comprising maintaining coherency within each of the plurality of last level cache memory banks.

11. The method of claim 9, wherein each of the instantiations of dedicated data channels is tiled adjacent to another instantiation of dedicated data channels on an integrated circuit.

12. The method of claim 11, wherein each of the instantiations of dedicated data channels uses credit loops to forward memory transactions to an adjacent instantiation of dedicated data channels.

13. The method of claim 9, wherein each instantiation of the dedicated data channels controls forward progress for memory transactions using a bypass block.

14. The method of claim 12, wherein non-qualified transactions are stored in a skid buffer until all the memory transactions are available to flow.

15. The method of claim 10, wherein each of the plurality of last level cache memory banks maintains coherency without content addressable memory.

16. The method of claim 9, wherein the interconnect network is configured to maintain order of instructions executed in in the plurality of central processing units.

17. A method of manufacturing a processor, comprising:
forming the processor as part of a wafer or package that includes at least one other processor, wherein the processor is configured to independently operate each dedicated data channel of an interconnect network comprising multiple instantiations of dedicated data channels, wherein each dedicated data channel is dedicated to a memory transaction type, each instantiation of the dedicated data channels comprises arbitration multiplexors and each instantiation of the dedicated data channels is connected to a plurality of central processing units, a plurality of core input/output units, and a plurality of last level cache memory banks; and
testing the processor, which includes testing the processor and at least one processor using one or more electrical to optical converters, one or more optical splitters that split an optical signal into two or more optical signals, and one or more optical to electrical converters,
wherein the arbitration multiplexors include right-to-left multiplexors, left-to-right multiplexors, and self multiplexors and each of the arbitration multiplexors implements a fairshare policy.

18. A method of constructing an integrated circuit, comprising:
generating a mask layout for a set of features for a layer of the integrated circuit, wherein the mask layout includes standard cell library macros for one or more circuit features that include a processor configured independently operate each dedicated data channel of an interconnect network comprising multiple instantiations of dedicated data channels, wherein each dedicated data channel is dedicated to a memory transaction type, each instantiation of the dedicated data channels comprises arbitration multiplexors and each instantiation of the dedicated data channels is connected to a plurality of central processing units, a plurality of core input/output units, and a plurality of last level cache memory banks;
disregarding relative positions of the macros for compliance to layout design rules during the generation of the mask layout;
checking the relative positions of the macros for compliance to layout design rules after generating the mask layout;
upon detection of noncompliance with the layout design rules by any of the macros, modifying the mask layout by modifying each of the noncompliant macros to comply with the layout design rules;
generating a mask according to the modified mask layout with the set of features for the layer of the integrated circuit; and
manufacturing the integrated circuit layer according to the mask, and
wherein the arbitration multiplexors include right-to-left multiplexors, left-to-right multiplexors, and self multiplexors and each of the arbitration multiplexors implements a fairshare policy.

* * * * *